United States Patent
Ortwein

(10) Patent No.: US 10,053,605 B2
(45) Date of Patent: Aug. 21, 2018

(54) FASTENING MEANS

(75) Inventor: Angelika Ortwein, Ebersbach (DE)

(73) Assignee: GLABETE GMBH, Ebersbach/Fils (DE)

( * ) Notice: Subject to any disclaimer, the term of this patent is extended or adjusted under 35 U.S.C. 154(b) by 1309 days.

(21) Appl. No.: 14/001,223

(22) PCT Filed: Jan. 17, 2012

(86) PCT No.: PCT/EP2012/050592
§ 371 (c)(1),
(2), (4) Date: Aug. 23, 2013

(87) PCT Pub. No.: WO2012/113589
PCT Pub. Date: Aug. 30, 2012

(65) Prior Publication Data
US 2017/0066948 A1  Mar. 9, 2017

(30) Foreign Application Priority Data

Feb. 24, 2011 (DE) .................. 10 2011 012 351

(51) Int. Cl.
*C09J 171/00* (2006.01)
*B05B 11/00* (2006.01)
(Continued)

(52) U.S. Cl.
CPC ............. *C09J 171/00* (2013.01); *B05B 11/30* (2013.01); *B05C 17/0052* (2013.01); *B05C 17/00583* (2013.01); *B05C 17/10* (2013.01); *B29C 65/4805* (2013.01); *B29C 65/522* (2013.01); *B29C 65/524* (2013.01); *C09J 5/00* (2013.01);
(Continued)

(58) Field of Classification Search
CPC ...................................................... C09J 171/00
See application file for complete search history.

(56) References Cited

U.S. PATENT DOCUMENTS

| 2009/0044364 A1* | 2/2009 | Verscheure ............. E04F 21/02 15/245.1 |
| 2009/0081470 A1* | 3/2009 | Jucker .................... C08G 18/10 428/447 |
| 2011/0100528 A1* | 5/2011 | Ronner ...................... C09J 5/00 156/91 |

FOREIGN PATENT DOCUMENTS

| WO | WO-2007/085622 A1 | 8/2007 |
| WO | WO-2009/156013 A1 | 12/2009 |

OTHER PUBLICATIONS

International Search Report of PCT/EP2012/050592 dated Aug. 10, 2012 with an English translation.

* cited by examiner

*Primary Examiner* — Daniel H Lee
(74) *Attorney, Agent, or Firm* — FisherBroyles, LLP; Robert Kinberg

(57) ABSTRACT

A fastening system for fixing an object on a base includes a first receptacle storing an aerobic adhesive and includes an associated first withdrawal device. A second receptacle, separate from the first receptacle, stores a free-flowing substance and includes an associated second withdrawal device. The first withdrawal device is configured to generate an aerobic adhesive layer with a height profile on the base. The second withdrawal device is configured to generate a surface layer of the free-flowing substance on the layer of aerobic adhesive with height profile to form a layer, whereby volumetric incorporations or inclusions of the free-flowing substance are formed in the aerobic adhesive when the object is pressed onto the layer structure.

11 Claims, 1 Drawing Sheet

(51) Int. Cl.
*B05C 17/005* (2006.01)
*B05C 17/10* (2006.01)
*C09J 5/00* (2006.01)
*C09J 183/04* (2006.01)
*F16B 11/00* (2006.01)
*B29C 65/48* (2006.01)
*B29C 65/52* (2006.01)
*B29K 83/00* (2006.01)
*B29L 9/00* (2006.01)

(52) U.S. Cl.
CPC ........... *C09J 183/04* (2013.01); *F16B 11/006* (2013.01); *B29K 2083/00* (2013.01); *B29K 2995/0037* (2013.01); *B29L 2009/00* (2013.01); *C09J 2471/00* (2013.01)

FASTENING MEANS

CROSS-REFERENCE TO RELATED APPLICATIONS

This application is a U.S. National Stage of International Application No. PCT/EP2012/050592 filed Jan. 17, 2012, claiming priority to German Application No. DE 10 2011 012 351.2 filed Feb. 24, 2011.

BACKGROUND OF THE INVENTION

The invention relates to a fastening system and a method for fixing an object on a base.

A fastener which consists of an aerobic adhesive and a hydrophilic substance is known from International Patent Application No. PCT-EP 2009/001623.

The fastener is created by adding the hydrophilic substance to the aerobic adhesive to form a mixture which does not require having surface contact with the environmental air in order to harden from this surface toward the inside. Rather, the hydrophilic substance present in the mixture which is distributed throughout the aerobic adhesive ensures that the aerobic adhesive contained in the mixture can harden from the inside out, even if there is no longer any contact with the moisture contained in the environmental air.

To obtain the required degree of moisture for the fastener according to the invention, moisture is metered into the mixture of aerobic adhesive and hydrophilic substance. For this, the moisture is metered into the hydrophilic substance before it is mixed into the aerobic adhesive.

In particular, the liquid is metered into the mixture of components by using a wooden spatula which is first submerged into water or generally into an amount of a liquid. The amount of water, or generally the amount of liquid, which can be absorbed by the spatula represents a metered amount of moisture that is supplied to the mixture of aerobic adhesive and hydrophilic substance. The hydrophilic substance in this case can function as a moisture buffer which can absorb excess moisture, or in general volatile agents, and can release these again as needed. As a result of the mixing operation, the moisture is distributed throughout the total volume of the mixture, thereby allowing it to harden completely.

SUMMARY OF THE INVENTION

It is an object of the present invention to provide a fastening system of the aforementioned type which is easy to handle.

The fastening system according to the invention is used for fixing an object on a base. The fastener is composed of an aerobic adhesive and a free-flowing substance. The aerobic adhesive is stored in a first receptacle with an associated first withdrawal device. The free-flowing substance is stored in a second receptacle, which is separate from the first receptacle, and is provided with in an associated second withdrawal device. The first withdrawal device is embodied such that it can be used to form a layer of aerobic adhesive with a height profile on the base. The second withdrawal device is embodied such that it can be used to form a surface layer of free-flowing substance on the layer of aerobic adhesive with the height profile. By pressing the object onto the layer structure produced in this way, inclusions of the free-flowing substance are distributed throughout the volume of the aerobic adhesive.

The fastening system according to the invention, respectively the inventive method, has the essential advantage that the operation for mixing the aerobic adhesive with the free-flowing substance can be omitted completely when producing the fastener, thereby considerably simplifying the handling of the fastener for producing a connection between an object and a base.

Instead, the mixing of the free-flowing substance and the aerobic adhesive to form the fastener, used to join the object and the base, occurs automatically during the operation of pressing the object against the base. A precondition is that the aerobic adhesive from the first receptacle is applied in the form of a layer with a height profile, using the first withdrawal device, wherein this layer differs from a flat layer in that height structures separated by valleys are formed. The absolute height differences in that case can vary over a wide range, and the height structures can be embodied and distributed homogeneously or non-homogeneously.

The surface layer of the free-flowing substance which is then applied to the layer of aerobic adhesive with height profile can be embodied either homogeneously or non-homogeneously. The surface layer of the free-flowing substance advantageously extends over the total surface of the aerobic adhesive layer with height profile, wherein this is not absolutely required.

If the object is subsequently placed onto the layer structure formed in this way, which consists of the layer of aerobic adhesive with height profile and the surface layer of free-flowing substance, so as to fix the object on the base, the peaks of the layer with height profile are pushed over in the direction of the valleys of this layer by the force used to press on the object, thereby allowing the free-flowing substance to be mixed into the volume of the aerobic adhesive, meaning it is mixed into the aerobic adhesive without requiring a separate operational step.

As a result of the free-flowing substance being dispersed throughout the aerobic adhesive, the fastener can harden quickly over the complete volume, without requiring any contact with the outside atmosphere or an external liquid supply. In particular, the fastener according to the invention can be used between two diffusion-tight surfaces to join these surfaces.

According to an embodiment of the invention, the aerobic adhesive is composed of silane MS polymers.

The aerobic adhesive may be stored inside a receptacle, for example a tube or a cartridge.

In principle, the first receptacle and the associated first withdrawal device can form separate units or can form a single unit, wherein this is particularly advantageous, meaning the withdrawal device is mounted directly on the receptacle.

In one embodiment the first withdrawal device is embodied in the form of a notched spatula. The aerobic adhesive is removed from the first receptacle and is applied with the notched spatula to the base. The layer of aerobic adhesive is thus given a height profile which corresponds to the notching structure of the notched spatula.

The free-flowing substance can be a mixture of a hydrophilic substance and a liquid-containing carrier. A hygroscopic substance can also be used in place of a hydrophilic substance. The hydrophilic substance in this case can be a solid material. As a result of the mixing with the liquid-containing carrier, a paste-type free-flowing substance develops, wherein water is particularly suitable for use as the liquid. The thereby achieved moisture content of the free-flowing substance, and thus also the moisture content of the mixture consisting of the free-flowing substance and the aerobic adhesive, ensures a hardening of the respectively generated fastener.

For this embodiment, the hydrophilic substances can be salts. The hydrophilic substances can furthermore also be hydrophilic carrier fibers, which can be natural fibers or chemical fibers and are preferably cotton fibers. In principle, chalk, flour, expanded clay, galactose, cotton wool, flax, hemp, viscose, cellulose, seaweed, felt or even wood fibers, filters with air pores or breathable materials in general are suitable for use as hydrophilic substances.

According to one embodiment of the invention, the free-flowing substance takes the form of a liquid, wherein the liquid may be a hydrophilic substance such as poly ethylene glycol. Furthermore suitable for use as hydrophilic liquids or, if applicable, hygroscopic liquids are polypropylene glycol, an oxygen solution, an alcohol, in particular isopropanol as a mixture with water. The hydrophilic liquid, or generally the hydrophilic substance, in most cases functions to cause a reaction with the aerobic adhesive through the exchange of liquid, oxygen, hydrogen, carbon and other reactive agents. In principle, however, the liquid can also be water.

Generating the free-flowing substance in the form of a liquid permits an especially easy handling when producing the fastener.

The liquid may be stored in a second receptacle in the form of a container, in particular a tube or a cartridge. A spray head may be attached to this container as the second withdrawal means. By activating the spray head, an almost homogeneous layer of the liquid can be applied easily, quickly and preferably covering the complete surface. Simply by placing the object onto the layer structure formed in this way, the liquid in the aerobic adhesive volume is mixed and thus forms the fastener which hardens quickly and completely because of the liquid share incorporated into the volume, even if it is cut off from the atmosphere.

The receptacles with the associated withdrawal devices together form an assembly set for producing the fastener according to the invention. The components of the assembly set or fastening system can either form separate units or can be combined to form partial structural units. In particular, all components of the assembly set can also be combined to form a single unit.

In any case, the assembly set can be used not once, but several times. This is based on the fact that the aerobic adhesive on the one hand and the free-flowing substance on the other hand are not only stored in separate receptacles, but are also provided with separate withdrawal devices for withdrawing the aerobic adhesive and the free-flowing substance. A mixing tube, or in general a component of the assembly set, which is used to mix the free-flowing substance and the aerobic adhesive before it is applied to the base is thus omitted as a result. It means that the assembly set does not comprise a component in which the aerobic adhesive comes in contact with the free-flowing substance and together with it hardens to form the fastener, in which case the component would no longer be usable.

BRIEF DESCRIPTION OF THE DRAWINGS

The invention is explained in the following with the aid of the drawings, which shown in.

DETAILED DESCRIPTION

Figure 1:
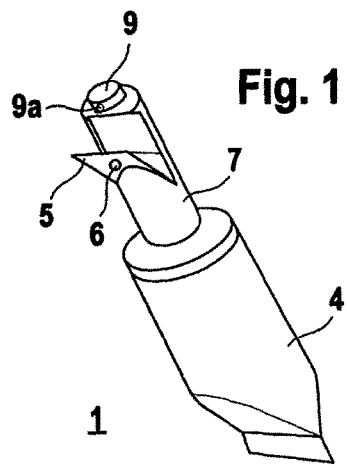
FIG. 1 An exemplary embodiment of an assembly set according to the invention.

FIG. 1 illustrates an exemplary embodiment of an assembly set 1 for producing a fastener 2, composed of a mixture of an aerobic adhesive 3 and a free-flowing substance, wherein the individual steps for producing the fastener 2 from the aerobic adhesive 3 and the free-flowing substance are shown in FIGS. 3 to 6.

Figure 2:
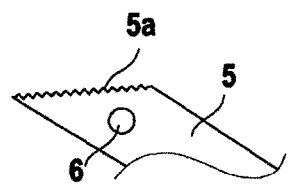
FIG. 2 A partial representation of this notched spatula for the assembly set according to FIG. 1.

The assembly set 1 comprises a first receptacle in the form of a tube 4 in which the aerobic adhesive 3 is stored as a single component. The aerobic adhesive 3 for the present case is composed of silane MS polymers. The tube 4 comprises a head section with thereon mounted notched spatula 5 which functions as withdrawal device for the aerobic adhesive 3. The notched spatula 5 is shown in a detailed illustration in FIG. 2, wherein this illustration furthermore shows that the front edge of the notched spatula 5 is provided with a notching 5a. An opening 6 for removing the aerobic adhesive 3 from the tube 4 and applying it to the notched spatula 5 is located in the region of the notched spatula 5. Alternatively, a profiled spatula or the like can also be used in place of the notched spatula 5.

A container 7 is provided in the head region of the tube 4 which is fixedly connected to the head and functions as the second receptacle. The free-flowing substance, which for the present case is a hydrophilic liquid 8, is stored in the container 7, wherein a mixture of isopropyl alcohol and water is preferably used as the hydrophilic liquid 8. A spray head 9 with an exit opening 9a is located on the top of the container 7, which the liquid 8 is sprayed from the container 7. The spray head 9 is embodied as a button for the present case. Pressing down on this button will activate the spray head 9, thus causing hydrophilic liquid 8 to be sprayed out of the exit opening 9a.

The assembly set 1 according to FIG. 1 forms a structural unit which can be activated with one hand by a person, thus permitting an easy handling. It is furthermore advantageous that the hydrophilic liquid 8 can be used for cleaning surfaces. With the aid of the aerobic adhesive 3 and the hydrophilic liquid 8, a fastener 2 is generated that serves to attach an object, in the present case for attaching a joining part 10 to a base 11. The steps required for this operation are shown in FIGS. 3 to 6.

Figure 3:
FIG. 3 A representation of a layer with height profile of an aerobic adhesive on a base, produced with the assembly set.

Aerobic adhesive 3 is initially applied with the notched spatula 5 to the base 11 (FIG. 3). In principle, this base 11 can first be cleaned with the hydrophilic liquid. Since the notched spatula 5 comprises a notching 5a, an aerobic adhesive 3 layer with a height profile is created on the base 11, wherein this layer has a toothed structure with a succession of peaks and valleys. Depending on the embodiment of the notching 5a of the notched spatula 5, the layer of aerobic adhesive 3 can also have a different type of height profile.

Figure 4:
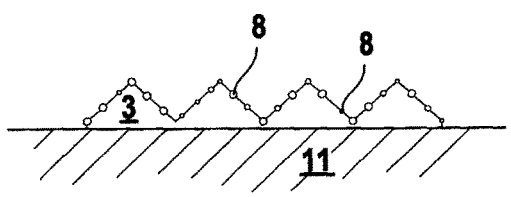
FIG. 4 A representation of the layer with height profile according to FIG. 3, with a surface layer of free-flowing substance applied thereto.

In a second step, a surface layer of hydrophilic liquid 8 is applied to the layer of aerobic adhesive 3 with height profile, as shown schematically in FIG. 4. The surface layer is applied by spraying on the hydrophilic liquid 8 from the container 7 of the assembly set 1. The spray head 9 is activated for this by pressing on it and the hydrophilic liquid 8 is sprayed out via the exit opening 9a. The hydrophilic liquid 8 is advantageously applied to the complete surface of the layer of aerobic adhesive 3 with height profile, wherein this layer is essentially distributed homogeneously.

Figure 5:
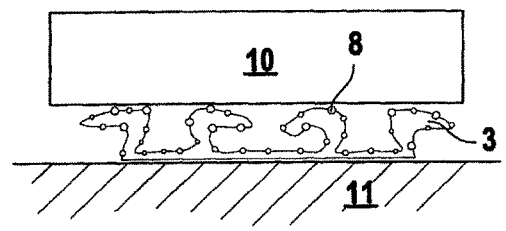
FIG. 5 A representation of the deformation of the layer structure, shown in FIG. 4, which is caused by placing an object on top.

There is no need to actively mix the hydrophilic liquid 8 in a separate operational step with the aerobic adhesive 3. Rather, the joining part 10 can be placed directly onto the layer structure, consisting of the layer of aerobic adhesive 3 with height profile and the surface layer of hydrophilic liquid 8 which is applied thereto. FIG. 5 shows the situation where the joining part 10 is at the point of making contact with the layer structure. Owing to the pressure exerted by the joining part 10, the peaks of the height-profile layer are pressed down in the direction of the valleys. A meandering structure is thus created, wherein the surface layer of hydrophilic liquid 8 on top of the layer of aerobic adhesive 3 is folded over multiple times. As a result and without further auxiliary mechanisms, simply by fitting on the part 10 to be joined, a volumetric mixing of the hydrophilic liquid 8 with the aerobic adhesive 3 takes place, meaning the hydrophilic liquid 8 is incorporated throughout the complete volume of the aerobic adhesive 3 and thus is mixed with it.

Figure 6:
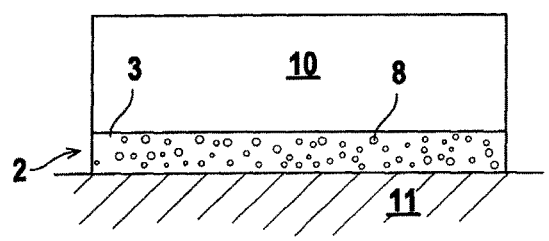
FIG. 6 A representation of the object affixed to the base with the aid of the fastener, formed with the aid of the layer structure according to FIG. 4.

FIG. 6 shows the situation where the joining part 10 is pressed completely against the base 11. As a result of the pressing operation, a layer of aerobic adhesive 3 is generated between the joining part 10 and the base 11 which is intermingled throughout the volume with hydrophilic liquid 8. The layer can thus react quickly and can harden over the complete volume to form the fastener 2, thereby fixedly connecting the joining part 10 and the base 11.

The invention claimed is:

1. A fastening system for fixing an object on a base, comprising:
    a fastener including an aerobic adhesive and a free-flowing substance;
    a first receptacle to store the aerobic adhesive and including an attached first withdrawal device;
    a second receptacle, separate from the first receptacle, to store the free-flowing substance and including an associated second withdrawal device;
    wherein the first withdrawal device is configured and arranged to generate an aerobic adhesive layer with a height profile having peaks and valleys as the aerobic adhesive is applied to the base, wherein the second withdrawal device is configured to generate a surface layer of the free-flowing substance on the layer of aerobic adhesive with the height profile to form a layer structure of the aerobic adhesive layer and the surface layer of the free flowing substance on the base, whereby volumetric inclusions of the free-flowing substance are formed in the aerobic adhesive when the object is pressed onto the layer structure and wherein the first and second receptacles and the first and second associated withdrawal devices form a single structural unit which is operable by one hand of a person.

2. The fastening system according to claim 1, wherein the first receptacle has a head section and the first withdrawal device comprises a notched spatula mounted on the head section of the first receptacle.

3. The fastening system according to claim 1, wherein the aerobic adhesive comprises polymers.

4. The fastening system according to claim 3, wherein the polymers comprise modified silane (MS) polymers.

5. The fastening system according to claim 1, wherein the free-flowing substance comprises a hydrophilic substance or a hygroscopic substance.

6. The fastening system according to claim 1, wherein the free-flowing substance comprises a liquid.

7. The fastening system according to claim 6, wherein the free-flowing substance comprises at least one of polyethylene glycol, polypropylene glycol, an oxygen solution, and an alcohol, mixed with water.

8. The fastening system according to claim 6, wherein the free-flowing substance comprises water.

9. The fastening system according to claim 6, wherein the second withdrawal device includes a spray head and the liquid is stored in the spray head.

10. The fastening system according to claim 1, wherein the first withdrawal device is configured and arranged to generate an aerobic adhesive layer with a height profile having peaks and valleys as the aerobic adhesive is applied to the base.

11. A method for fixing an object on a base with the aid of a fastener according to claim 1, the method comprising:
    storing the aerobic adhesive in the first receptacle with the attached first withdrawal device;
    storing a free-flowing substance in a second receptacle with the associated second withdrawal device;
    generating a layer of aerobic adhesive with the height profile comprising peaks and valleys with the first withdrawal device as the aerobic adhesive is applied to the base with the first withdrawal device;
    forming a surface layer of free-flowing substance on the layer of aerobic adhesive with the height profile with the second withdrawal device to form a layer structure; and
    pressing the object onto the layer structure to form volumetric inclusions of the free-flowing substance in the aerobic adhesive.

* * * * *